3,108,948
PETROLEUM REFINING
Sidney B. Ring, St. Louis, Mo., assignor to Petrolite Corporation, Wilmington, Del., a corporation of Delaware
No Drawing. Filed May 9, 1960, Ser. No. 27,490
10 Claims. (Cl. 208—189)

This invention relates to petroleum refining and more particularly to the dethiolation of undesirable sulfur compounds in petroleum, such as petroleum distillates, by a process which comprises treating petroleum with an epoxide in the presence of an ion exchange resin.

Petroleum products contain undesirable sulfur compounds such as mercaptans which impart to such products, for example the distillates, an objectionable odor and corrosiveness. These distillates, known as "sour" distillates, have been the object of many processes for removing these undesirable sulfur compounds by an operation called "sweetening."

Although sour distillates have been sweetened heretofore by means of epoxides, there has not been devised a facile method of sweentening with epoxides wherein a long-lived, easily prepared, highly porous fixed bed catalyst of high catalytic efficiency which is easily adaptable to continuous refinery processing.

I have now discovered a process of dethiolizing undesirable surfur compounds in petroleum, such as petroleum distillates, which comprises treating petroleum with an epoxide in the presence of an ion exchange resin.

THE ION EXCHANGE RESIN

A wide variety of ion exchange resins can be employed in the process. In general, ion exchange resins can be classified as (1) strong acid cation exchangers, for example

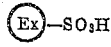

(2) weak acid cation exchanger, for example,

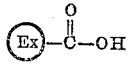

(3) strong base anion exchanger, for example

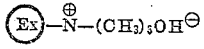

(4) weak base anionic exchanger, for example

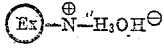

where

where Ex represents the resin backbone to which the functional groups are attached.

If proper reaction conditions such as temperature control, ratios, contact time, etc., are employed, all of these types of ion exchange resins can be employed. However, for greater efficiency either a strong acid cation exchanger or a strong base anionic exchanger should be employed. Optimum efficiency is obtained by employing a strong base anion exchanger.

It is well known that both anionic and cationic exchange resins are complex in structure. Consequently, no specific structure can be assigned to any particular resin. However, it is possible to distinguish strongly basic from weakly basic ion exchange resins. In general, the commercial ion exchange resins vary considerably as to their basic strength, and this is indicated by titration with hydrochloric acid. For example, a representative weakly basic resin is neutralized in the range of pH of about 7 to 2. The degree of adsorption of a weak acid on a weakly basic ion exchange resin is controlled principally by the ionization constant of the acid and can be expressed quantitatively. In general, the weakly basic resins are not sufficiently basic to appreciably neutralize in aqueous solutions such weak acids as silicic acid, carbonic acid, hydrocyanic acid, phenols and the like, whereas the strongly basic resins will neutralize such acids.

Typical of the strongly basic anion exchange resins are the resins which can be purchased and are known as "Amberlite IRA-400" and "Amberlite IRA-410" which, according to Rohm & Haas, can be adequately described as styrene copolymers chloromethylated and aminated to quaternary ammonium hydroxide materials. Other strongly basic anion exchange resins are those available and commercially known as "Dowex 1," and "2" which are quaternary amines with styrene-divinyl-benzene nuclei.

In general, a strongly basic ion exchange resin is one which on titration with hydrochloric acid in water free from electrolytes has a pH above about 7.0 when the amount of hydrochloric acid added is one-half of that required to reach the equivalence point. A weakly basic ion exchange resin under the same conditions has a pH below about 7.0 when one-half of the acid required to reach the equivalence point has been added.

A strongly acidic ion exchange resin is one which on titration with sodium hydroxide in water free from electrolytes has a pH below about 7.0 when the amount of sodium hydroxide added is one-half of that required to reach the equivalence point. A weakly acidic ion exchange resin under the same conditions has a pH above about 7.0 when one-half of the sodium hydroxide has been added to the electrolyte-free water to reach the equivalence point.

Representative of the strongly acidic cation exchange resins are those prepared by the sulfonation with sulfuric acid of the copolymer prepared from styrene and divinyl-benzene. U.S. Patents Nos. 2,500,149, 2,466,675, and 2,366,007 are relevant to this class of cation exchange resins. Strongly acidic cation exchange resins can also be prepared by other reactions such as by reacting an aldehyde, a phenol, with a sulfonic acid or sulfite. Typical examples are given in U.S. Patents Nos. 2,518,420, 2,549,745, 2,525,247, and 2,529,602. Typical of these strongly acidic cation exchange resins are those which can be purchased and are known commercially as "Amberlite IR-120" and "Dowex 50," etc.

Typical of the weakly acidic cation exchange resins are those described in U.S. Patent No. 2,480,970 prepared by the reaction of phthalic anhydride with phenol using an acid catalyst such as sulfuric acid in the presence of formaldehyde, and those described in U.S. Patents Nos. 2,340,110 and 2,340,111 comprising a copolymer of a polymerizable mixture of at least one compound having a polymerizable CH=C< grouping and at least one other polymerizable grouping, for example acrylic acid and ethylene dimethacrylate, polymerized in the presence of one percent benzoyl peroxide as a polymerization accelerator.

Weakly basic anion exchange resins can be prepared by the polymerization of amines such as aniline and metaphenylenediamine with formaldehyde or by condensing phenols, formaldehyde and amines. (U.S. Patents Nos. 2,521,288, 2,485,485, 2,546,938, 2,362,086, 2,442,989, and 2,529,142.) Resins of this type can be purchased and are known commercially as "Amberlite IR-45," "Amberlite IR-4B" and "De Acidite."

THE EPOXIDE

Any suitable epoxide reagent can be used in the process. Suitable compounds are those having a three-member heterocyclic ring containing one oxygen atom and two carbon atoms. Preferred epoxide reagents for use according to the invention are those having the formula:

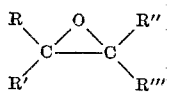

where R is selected from the group consisting of hydrogen, hydrocarbon radicals, for example those having 1 to 5 carbon atoms, halogen radicals, alkoxyalkyl or other hydrocarbyloxy alkyl radicals, and where R', R'' and R''' are each selected from the group consisting of hydrogen, hydrocarbon radicals, for example having 1 to 5 carbon atoms, and halogen radicals. More preferably the hydrocarbon radicals have 1 to 3 carbon atoms. Examples of suitable epoxides are ethylene oxide, propylene oxide, butylene oxide, amylene oxide, styrene oxide, phenoxy propylene oxide, butoxy propylene oxide, epichlorohydrin, butadiene oxide, etc. Useful higher oxides also include cyclohexane oxide, epichlorohydrin, glycide, decene oxide, etc. Because of commercial availability and reaction rate, such epoxides as ethylene, propylene and butylene epoxides are generally employed.

THE PROCESS

In general, the process is carried out by passing or percolating an epoxide containing sour petroleum through an ion exchange resin at a rate sufficient for sweetening. The mechanism of sweetening is believed to be caused by reaction of the epoxide with mercaptans resulting in dethiolation. In general, these reaction products are not objectionable if left in the petroleum oil. If desired, they can be removed from the oil by water washing. Other types of constituents present in the oil which are generally less objectionable than mercaptans, for example hydrogen sulfide, phenol, nitrogen bases, carboxylic acids, etc., will also react with epoxides to form products which are generally less objectionable than the original material prior to reaction with the epoxide.

The ion exchange resin is believed to exert a catalytic effect on the reaction between the epoxide and the mercaptan. The resin is not consumed. With the strongly basic resin there is an intermediate reaction of mercaptans, for example, with the resin to form resin mercaptides, followed by reaction of the resin mercaptides with the epoxide to form the free resin again and the thioether type of reaction product.

In another embodiment of the invention, a petroleum fraction containing mercaptans can be percolated through the bed of resin in the absence of epoxide. Resin mercaptides are formed and retained by the solid particles. Periodically, the flow of charge is discontinued, and a hydrocarbon liquid containing added epoxide and free of organic constituents reactive with the resin is percolated through the bed. The epoxide reacts with the resin mercaptides to regenerate the resin and form thioethers which are largely carried out by the effluent hydrocarbon liquid.

The process of the invention is applicable generally to petroleum materials. The charge material is in a fluid state when contacted with the solid treating agent, and is preferably in the liquid state. Suitable charge materials include natural gas, refinery gas, dry gas, liquefied petroleum gases, gasoline, kerosene, mineral spirits, gas oil, furnace oil, stove oil, diesel fuel, jet fuel, etc. Straight run or thermally or catalytically cracked or otherwise converted fractions can be treated.

The temperature employed will vary with the particular type of resin and epoxide employed. In general, lower temperatures are employed with the strongly acid or strongly basic resins. Preferably, the process is carried out at approximately room temperature, but higher or lower temperatures, for example from 0° C. to 150° C. or more, preferably room temperatures to 50° C. can be employed if desired. Usually, temperatures above 50° C. are not employed, since many resins often soften above this temperature and the expense of employing a higher temperature is not warranted. In practice, the upper temperature limit is generally the decomposition temperature of the ion exchange resin which in the case of Amberlites XE 75 is about 60° C. Preferably, the pressure employed is approximately atmospheric, though higher or lower pressures can be employed if desired. For example, elevated pressure may be employed to maintain a volatile charge material in liquid phase. Usually pressures above about 100 p.s.i.g. are not warranted.

The amount of epoxide employed in the process will depend on the amount of materials reactive therewith which are to be converted. In general, the mole ratio of epoxide to mercaptan sulfur will vary from 1 to 10 or higher, but preferably 1.25–5, with an optimum of 2–4.

One factor that aids in sweetening is the porosity of the resin. Since these resins are essentially jelled materials having a sponge-like structure, the porous structure of the resin collapses somewhat and the porosity is somewhat affected. Accordingly, it is highly advantageous to maintain the pore structure. To obtain a fully swelled structure about 35% or more of water may be required and advantages of the presence of water are realized with as low as 10% water in the resins. Such water can be added to the resin prior to contact with the oil or simultaneously therewith. Generally an aqueous alkali wash is sufficient to furnish the required water. A small amount of water may be added continuously to the oil stream to maintain the required water concentration in the resin.

Suitable procedures for using an anion exchange resin include the following. When starting with fresh strongly basic anion exchange material which is received from the supplier in the form of a salt of a strong acid, such as the chloride, the exchange material is treated with an aqueous solution of an alkali metal hydroxide. It has been found that treating one volume of exchange material in the chloride form with 40 volumes of 4 percent aqueous sodium hydroxide solution converts the exchange material to the hydroxyl form.

In the preferred embodiment, the ion exchange resin is also washed with a monohydric alcohol in the following manner. The strongly basic anion exchange material in the hydroxyl form is washed, when desirable or necessary, with the water which is itself substantailly free from anions until the washings are neutral. However, absolute neutrality is not essential. The exchange material is then ready for the treatment of non-aqueous solutions. Greater sweetening efficiency can be obtained by also activating the exchange resin with a monohydric alkanol or a mixture of monohydric alcohols having 1 to 5 carbon atoms. This is effected by washing the hydroxyl resin with an alkanol such as ethanol prior to use.

Suitable alkanols include methanol, ethanol, propanol, butanol, pentanol, mixtures thereof, etc.

Examples

The following examples are presented for purposes of illustration and not of limitation. Since excellent ion exchange resins are commercially available, these are used in the following examples. The resins employed are those manufactured and sold by Rohm & Hass Company, which are strongly basic resins prepared as styrene copoplymers which are chloromethylated and aminated to quaternary ammonium chloride materials, as described for example, in U.S.P. 2,591,573; and those manufactured and sold by Dow Chemical Company which are quaternary amines with styrene-divinyl benzen nuceli. These resins are employed in the hydroxyl form. Where the resin is in the chloride form it is treated with alkali before use to generate the hydroxyl form.

Sour straight run gasoline containing alkylene oxides in a 2.5-3 mole ratio of oxide to mercaptan sulfur (as determined by titration with a standard solution containing silver ions) are percolated through ion exchange resins at both room temperature and at 40° C. to obtain commercially acceptable sweetened gasoline. The data thereof is presented in the following table.

The resin is activated in the following manner. About 1 volume of resin in a column is treated with 40 volumes of 4% aqueous sodium hydroxide percolated through it to convert from the chloride form, in which the manufacturers ship it, to the hydroxyl form. The hydroxyl resin is then washed with distilled water until neutral. Thereupon the hydroxyl resin is washed with 5 volumes of ethanol, which is then washed with a sweet hydrocarbon. Then the bed is ready for use.

TABLE I

| Ex. | Alkylene Oxide | Temperature | Ion Exchange Resin | Resin |
|---|---|---|---|---|
| 1 | Ethylene oxide | Room Temperature | Amberlite XE-75. | Strong base. |
| 2 | do | 40° C | do | Do. |
| 3 | Propylene oxide | Room temperature | do | Do. |
| 4 | do | 40° C | do | Do. |
| 5 | Butylene oxide | Room temperature | do | Do. |
| 6 | do | do | do | Do. |
| 7 | Ethylene oxide | Room temperature | Dowex 1 | Do. |
| 8 | do | 40° C | do | Do. |
| 9 | Propylene oxide | Room temperature | do | Do. |
| 10 | do | 40° C | do | Do. |
| 11 | Butylene oxide | Room temperature | do | Do. |
| 12 | do | do | do | Do. |
| 13 | Ethylene oxide | 40° C | Amberlite IR-120. | Strong acid. |
| 14 | Propylent oxide | 40° C | do | Do. |
| 15 | Butylene oxide | 40° C | do | Dowex 50 | Do. |

Many variations on this procedure are possible, for example, petroleum can be passed through one or more stationary beds of ion exchange resin, or concurrent or counter-current to a moving bed or the resin can be mixed with petroleum and the mixture agitated in a batch operation and the petroleum separated from the resin.

In addition this process can also be used to remove other compounds present in the oil which react with olefin oxides, for example, to dehydrate petroleum by reacting petroleum which contains water with ethylene oxide in the presence of an ion exchange resin.

Having thus described my invention what I claim as new and desire to secure by Letters Patent is:

1. A process of sweetening petroleum comprising treating sour petroleum with an epoxide having a heterocyclic ring consisting of one oxygen atom and two carbon atoms in the presence of an ion exchange resin.

2. A process of sweetening petroleum comprising treating sour petroleum with an epoxide having a heterocyclic ring consisting of an oxygen atom and two carbon atoms in the presence of an ion exchange resin selected from the group consisting of strongly acidic and strongly basic ion exchange resins.

3. A process of sweetening petroleum comprising treating sour petroleum with an alkylene epoxide having the formula

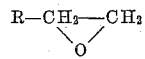

wherein R is selected from the group consisting of hydrogen and an alkyl group having 1-3 carbon atoms,
in the presence of an ion exchange resin selected from the group consisting of strongly acidic and strongly basic ion exchange resins.

4. The process of claim 3 wherein the ion exchange resin is a strongly basic ion exchange resin.

5. The process of claim 3 wherein the ion exchange resin is washed prior to reaction with an alkanol having 1-5 carbon atoms.

6. A process of sweetening petroleum distillate comprising treating sour petroleum distillate with an epoxide having a heterocyclic ring consisting of one oxygen atom and two carbon atoms in the presence of an ion exchange resin.

7. A process of sweetening petroleum distillate comprising treating sour petroleum distillate with an epoxide having a heterocyclic ring consisting of one oxygen atom and two carbon atoms in the presence of an ion exchange resin selected from the group consisting of strongly acidic and strongly basic ion exchange resins.

8. A process of sweetening petroleum distillate comprising treating sour petroleum distillate with an alkylene epoxide having the formula

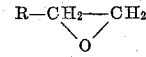

where R is selected from the group consisting of hydrogen and an alkyl group having 1-3 carbon atoms,
in the presence of an ion exchange resin selected from the group consisting of strongly acidic and strongly basic ion exchange resins.

9. The process of claim 8 wherein the ion exchange resin is a strongly basic ion exchange resin.

10. The process of claim 8 wherein the ion exchange resin is washed prior to reaction with an alkanol having 1-5 carbon atoms.

References Cited in the file of this patent
UNITED STATES PATENTS

| | | |
|---|---|---|
| 2,530,561 | Arnold et al. | Nov. 21, 1950 |
| 2,713,077 | Rieve | July 12, 1955 |
| 2,718,489 | Coonradt et al. | Sept. 20, 1955 |
| 2,730,486 | Coonradt et al. | Jan. 10, 1956 |
| 2,775,545 | Sandner et al. | Dec. 25, 1956 |